United States Patent
Schwarz et al.

(10) Patent No.: US 12,489,963 B2
(45) Date of Patent: Dec. 2, 2025

(54) IMAGING DEVICE FOR A SHELF SUPPORT AND SHELF SYSTEM COMPRISING THE IMAGING DEVICE

(71) Applicant: SES-imagotag, Nanterre (FR)

(72) Inventors: Thomas Schwarz, Hohberg (DE); Andreas Rößl, Voitsberg (AT)

(73) Assignee: SES-imagotag (FR)

( * ) Notice: Subject to any disclaimer, the term of this patent is extended or adjusted under 35 U.S.C. 154(b) by 0 days.

(21) Appl. No.: 18/773,906

(22) Filed: Jul. 16, 2024

(65) Prior Publication Data

US 2024/0373114 A1 Nov. 7, 2024

Related U.S. Application Data

(63) Continuation of application No. 17/627,187, filed as application No. PCT/EP2020/070024 on Jul. 15, 2020, now Pat. No. 12,069,362.

(30) Foreign Application Priority Data

Jul. 15, 2019 (FR) .................................. 1907973

(51) Int. Cl.
*H04N 23/57* (2023.01)
*H04N 7/18* (2006.01)
(Continued)

(52) U.S. Cl.
CPC ............. *H04N 23/57* (2023.01); *H04N 7/183* (2013.01); *H04N 23/66* (2023.01); *H04N 23/695* (2023.01)

(58) Field of Classification Search
CPC ...... H04N 23/57; H04N 23/66; H04N 23/695; H04N 7/183
See application file for complete search history.

(56) References Cited

U.S. PATENT DOCUMENTS 5,704,049 A * 12/1997 Briechle ................ G06Q 30/02
705/28
5,753,900 A * 5/1998 Goodwin, III ............ G09F 9/33
235/383
(Continued)

FOREIGN PATENT DOCUMENTS

CN 107890243 A 4/2018
CN 108960202 A 12/2018
(Continued)

OTHER PUBLICATIONS

French Search Report for Application No. FR 1907973 dated Mar. 13, 2020, pp. 1-2.
(Continued)

*Primary Examiner* — James R Sheleheda
(74) *Attorney, Agent, or Firm* — Lerner David LLP

(57) ABSTRACT

The invention relates to an imaging device for a shelf support on a shelf edge and comprising a receiving section configured to receive electronic labels, the imaging device comprising a back side configured to be removably fitted in the receiving section, a front side opposite to the back side, an optical sensor configured to acquire an image of shelves facing the front side, an actuator configured to rotate the optical sensor around one or more axes of rotation, a memory configured to save the image, a processing unit configured to transmit the image to an image server.

6 Claims, 5 Drawing Sheets

(51) Int. Cl.
*H04N 23/66* (2023.01)
*H04N 23/695* (2023.01)

(56) References Cited

U.S. PATENT DOCUMENTS

| | | | | |
|---|---|---|---|---|
| 6,712,324 | B2* | 3/2004 | Catteau | G09F 3/208 |
| | | | | 248/222.51 |
| 8,061,601 | B1* | 11/2011 | Harkins | G06Q 30/06 |
| | | | | 235/383 |
| 8,479,422 | B1* | 7/2013 | Kato | G09F 3/204 |
| | | | | 235/383 |
| 9,380,222 | B2 | 6/2016 | Clayton et al. | |
| 11,189,044 | B2 | 11/2021 | Zhang et al. | |
| 11,288,734 | B2 | 3/2022 | Howard et al. | |
| 11,688,253 | B2* | 6/2023 | Hare, Jr. | H04B 10/116 |
| | | | | 340/332 |
| 2003/0071764 | A1* | 4/2003 | Peterson | G06F 3/147 |
| | | | | 345/1.1 |
| 2006/0151601 | A1* | 7/2006 | Rosenfeld | G06Q 20/203 |
| | | | | 235/383 |
| 2009/0248198 | A1 | 10/2009 | Siegel et al. | |
| 2010/0031548 | A1* | 2/2010 | Lee | G09F 3/204 |
| | | | | 40/655 |
| 2013/0024023 | A1* | 1/2013 | Siegel | A47F 1/126 |
| | | | | 700/244 |
| 2013/0293581 | A1 | 11/2013 | Wissner-Gross et al. | |
| 2013/0313317 | A1* | 11/2013 | Waters | G06Q 10/08 |
| | | | | 235/487 |
| 2014/0360232 | A1* | 12/2014 | Al-Kahwati | G07C 9/00571 |
| | | | | 70/14 |
| 2015/0029339 | A1 | 1/2015 | Kobres et al. | |
| 2015/0146018 | A1* | 5/2015 | Kayser | H04N 1/00204 |
| | | | | 348/333.01 |
| 2015/0279018 | A1 | 10/2015 | Bajard et al. | |
| 2015/0348060 | A1 | 12/2015 | Ogawa et al. | |
| 2015/0365660 | A1 | 12/2015 | Wu et al. | |
| 2016/0029102 | A1 | 1/2016 | Daily et al. | |
| 2016/0034988 | A1 | 2/2016 | Howard et al. | |
| 2016/0048907 | A1* | 2/2016 | Park | G06Q 30/0641 |
| | | | | 345/634 |
| 2016/0104397 | A1* | 4/2016 | Kim | G09F 3/208 |
| | | | | 40/5 |
| 2017/0032311 | A1 | 2/2017 | Rizzolo et al. | |
| 2017/0105300 | A1* | 4/2017 | Howard | H05K 5/0247 |
| 2018/0041701 | A1 | 2/2018 | Yanagi | |
| 2018/0168366 | A1* | 6/2018 | Bryan | G09F 3/208 |
| 2018/0234635 | A1 | 8/2018 | Hayashi | |
| 2019/0080633 | A1 | 3/2019 | Bottine | |
| 2019/0132507 | A1 | 5/2019 | Kishida et al. | |
| 2019/0188782 | A1 | 6/2019 | Howard et al. | |
| 2019/0362300 | A1 | 11/2019 | Bottine et al. | |
| 2020/0234227 | A1 | 7/2020 | Gadou et al. | |
| 2020/0251042 | A1 | 8/2020 | Wang et al. | |
| 2020/0286135 | A1* | 9/2020 | Matayoshi | G09F 3/204 |
| 2020/0402429 | A1* | 12/2020 | Cho | G06Q 20/208 |
| 2021/0173603 | A1 | 6/2021 | Collet et al. | |
| 2021/0304256 | A1* | 9/2021 | Ishida | G06V 20/52 |
| 2021/0398060 | A1 | 12/2021 | Chaubard | |
| 2022/0108469 | A1 | 4/2022 | Lu et al. | |
| 2022/0117414 | A1 | 4/2022 | Oosthoek et al. | |
| 2022/0161763 | A1 | 5/2022 | Schumacher et al. | |
| 2022/0318729 | A1* | 10/2022 | Rao | H04N 23/54 |
| 2023/0042843 | A1 | 2/2023 | Rossl | |
| 2023/0185169 | A1 | 6/2023 | Files et al. | |
| 2023/0306451 | A1 | 9/2023 | Chaubard | |
| 2024/0373114 | A1* | 11/2024 | Schwarz | H04N 23/695 |

FOREIGN PATENT DOCUMENTS

| | | | | |
|---|---|---|---|---|
| CN | 109284686 | A | | 1/2019 |
| CN | 109308434 | A | | 2/2019 |
| CN | 109523691 | A | | 3/2019 |
| JP | 2005115797 | A | | 4/2005 |
| JP | 2009031892 | A | | 2/2009 |
| JP | 2009195333 | A | * | 9/2009 |
| JP | 2014220609 | A | | 11/2014 |
| JP | 2015159419 | A | | 9/2015 |
| JP | 2018-055248 | A | | 4/2018 |
| KR | 20140068513 | A | | 6/2014 |
| WO | WO-9858360 | A1 | * | 12/1998 ............ G09F 3/204 |
| WO | 2015040661 | A1 | | 3/2015 |
| WO | WO-2017153481 | A1 | * | 9/2017 ............ G06F 3/147 |
| WO | 2017199398 | A1 | | 11/2017 |
| WO | 2018046701 | A1 | | 3/2018 |
| WO | 2018102575 | A1 | | 6/2018 |
| WO | 2019073063 | A1 | | 4/2019 |

OTHER PUBLICATIONS

International Search Report for Application No. PCT/EP2020/070024 mailed Sep. 16, 2020, pp. 1-3.

Search Report dated Apr. 11, 2024 from Office Action for Chinese Application No. 2020800517613 issued Apr. 12, 2024. 2 pgs.

* cited by examiner

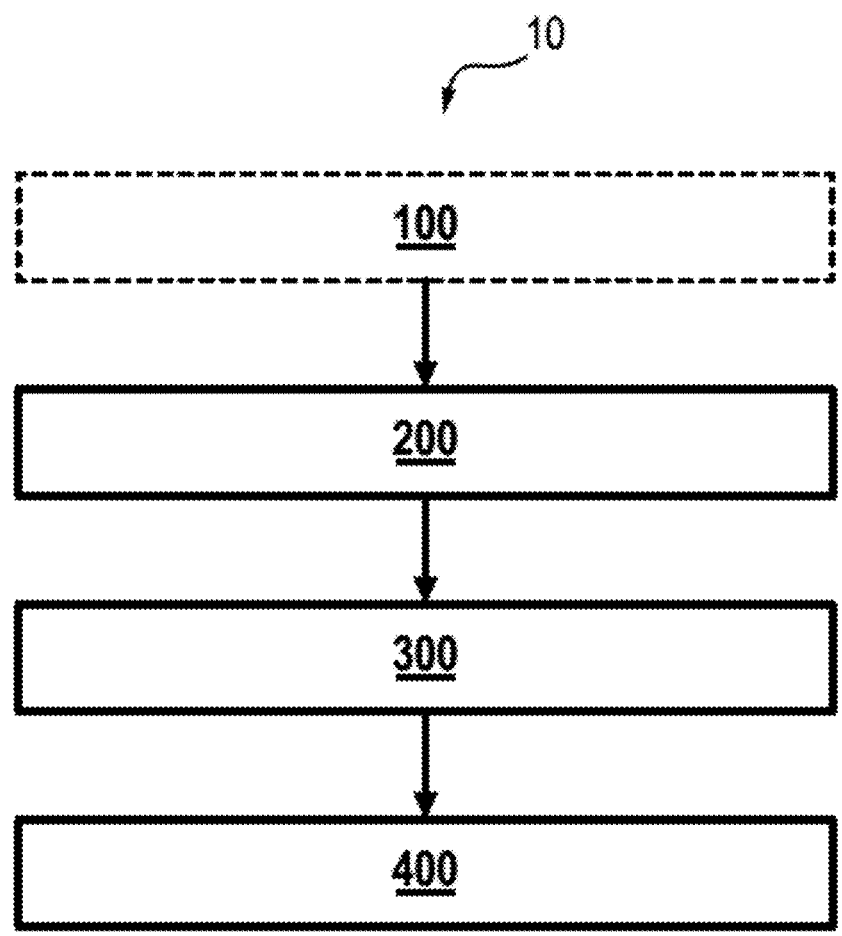

IMAGING DEVICE FOR A SHELF SUPPORT AND SHELF SYSTEM COMPRISING THE IMAGING DEVICE

CROSS-REFERENCE TO RELATED APPLICATIONS

The present application is a continuation of U.S. patent application Ser. No. 17/627,187, filed on Jan. 14, 2022, which application is a national phase entry under 35 U.S.C § 371 of International Application No. PCT/EP2020/070024 filed Jul. 15, 2020, which claims priority from French Application No. 1907973, filed Jul. 15, 2019, all of which are hereby incorporated herein by reference.

TECHNICAL FIELD

The present invention pertains to the field of electronic imaging systems for shelves, in particular imaging systems for shelves of a sales area used to control the layout of electronic labels and articles in the shelves.

The invention is directed to an imaging device adapted to be received in a shelf support, to a shelf system comprising such imaging device, and to a method for image acquisition using such imaging device.

PRIOR ART

Shelves of a salespoint are generally organized in gondolas. Each gondola comprises several rows, and each row comprises several shelf labels situated in the vicinity of articles. The shelf labels are disposed along the front edge of the shelves and display information related to articles offered for sale, such as price, price per weight, name of the article, etc.

In order to allow easy and fast article information updates and to decrease the operational costs, the use of electronic shelf labels (referred to below as "ESLs") in shelves is widely known. The article information displayed on the screen of one ESL is remotely controlled by radiofrequency, be it low frequency, high frequency or ultra-high frequency.

Over time, the positions of articles on sale in the shelves can change, for instance when the gondolas are re-ordered or in the case of seasonal products. In recent years, there has been an effort to create "realograms", i.e. planograms providing a realistic view of the facing of the gondolas. The realogram takes into account any changes made to the assignment of shelf spaces to articles, or changes made to the assignment of ESLs to articles. The realogram database is therefore meant as a reliable and up-to-date representation of the real shelving visible for the customers of the sales area.

The provision of a reliable and complete realogram database allows development of a plurality of useful applications, such as specific promotional content taking into account the position of the customers in front of the shelves, or geolocation of articles within the sales area to speed up the re-stocking and/or the picking of products by the personnel of the sales area.

In order to monitor the layout of articles in the shelves and to complete the realogram, an option is to install imaging systems in the sales area. The imaging systems preferably provide a real-time view of the shelves of the sales area. On the basis of the images or videos provided by the imaging systems, image processing methods are carried out for several applications, including automated detection of empty shelf spaces, automated detection of ESLs, verification of compliance between a real facing and an expected facing for the articles, etc.

The most commonly used imaging systems are cameras fixed to the ceiling or at other strategic locations in the sales area. Each camera is arranged such that the direction of sight of the camera points towards the gondolas. In order to hide said cameras from the customers, said cameras can be placed behind pillars of the sales area, or in a false ceiling.

The use of generic cameras suspended to a ceiling causes several problems.

Power supply to the cameras requires specific wiring. This wiring is unpractical and not aesthetically pleasing for the customer. Hardwired connections are voluminous and difficult to hide from the customers. Besides, additional electrical components may be required to ensure an adequate power supply to the cameras.

In addition, the provided images do not match the actual customer perception of the arrangement of articles and ESLs in the shelves. When a customer chooses products to buy, the customer directly faces the gondola. A suspended camera provides a view from above which mainly shows articles located on the ground or at lower levels of the gondolas. Images of articles displayed in lower levels of the gondolas are more difficult to acquire. The suspended camera does therefore not provide images which correspond to the actual visibility conditions of the customer.

Besides, the camera is not easily accessible by the personnel of the sales area, especially if the camera is suspended over a ceiling. It is not easy to replace or reposition the camera. This further increases the installation and maintenance costs.

In addition, a suspended camera must be connected to a server either via hardwired connections or wireless connections. Some of the aforementioned problems can be addressed by using a wirelessly connected camera, but wireless connections usually give rise to difficult challenges in terms of radio coverage of the zone of the camera, especially if the camera is in the ceiling.

GENERAL PRESENTATION OF THE INVENTION

In light of the above, the need arises for an imaging device of a sales area which is suitable to be placed at a position reflecting the line of sight of a customer in an aisle of the sales area more accurately. In this manner, the provided images or sequences of images represent what the customer actually sees. The articles located at lower levels of the gondolas need to be visible if desired.

Another need arises for an imaging system which is more easily supplied with power. Additional wiring associated with the imaging system should be avoided, so as to render the imaging system less costly and less detrimental to the general aesthetical qualities of the sales area for the customers.

Another need arises for an imaging system which can be easily accessed by an operator, while still being firmly held in place in order to avoid malicious acts. The sought imaging system is easily replaceable and repositionable.

An additional problem to be solved is adaptation of the images acquired by the imaging system to the layout of the surrounding aisles, so that the acquired images specifically display some particular elements which need to be photographed.

Another need arises for an improved method for acquisition of images of shelves of a sales area, especially for acquisition of images of a front plane of a gondola.

As such, a first object of the invention is an imaging device for a shelf support, wherein the shelf support is installed on a shelf edge and comprises a receiving section configured to receive electronic labels on the shelf support, the imaging device comprising:
- a back side configured to be removably fitted in the receiving section,
- a front side opposite to the back side,
- an optical sensor configured to acquire an image of shelves facing the front side,
- a memory configured to save the image and a processing unit configured to transmit the image to an image server.

Thanks to the position of the imaging device on an edge of a shelf, and thanks to the optical sensor located on the front side of the imaging device, the imaging device is able to acquire images of products located in the gondolas. The optical sensor can be adjusted with an orientation and at a height with respect to the floor which accurately reflects the line of sight of a person standing on the floor.

Besides, the imaging device is received in a shelf support which is also suited to accommodate electronic shelf labels (ESL). The power supply for the imaging device is advantageously similar to the power supply for the electronic shelf labels. There is no need for additional wiring for external power supply to the imaging device. Existing protocols for data communication between the ESLs and a central server of the sales area are advantageously also used to communicate with the imaging device.

The imaging device of the invention has a back side which is configured to fit in a shelf support which extends along an edge of a shelf. Since the imaging device is removable from the support, it can easily be displaced or replaced. This lowers the installation costs for the imaging device or plurality of imaging devices to be installed in the sales area.

The imaging device of the invention favorably replaces a camera suspended over a ceiling. For the aforementioned reasons, the imaging device of the invention is less detrimental to the aesthetics of the sales area and installation and maintenance are less costly.

The above-defined system can comprise the following advantageous and non-limiting features, taken alone or in any technically feasible combination:
- the imaging device further comprises a casing, the casing comprising the front side and the back side, wherein the memory, the processing unit and the optical sensor are arranged inside the casing.
- the casing comprises a locking member which is movable between a retracted position and an extended position, the locking member being configured to releasably engage with a locking element of the shelf support when the locking member is in the extended position.
- the optical sensor has an uninfluenced position wherein a direction of sight of the optical sensor is perpendicular to the front side.
- the imaging device further comprises an actuator configured to rotate the optical sensor around one or more axes of rotation.
- said one or more axes of rotation comprise an axis of rotation which is parallel to the front side.
- the imaging device further comprises a wheel linked in rotation with the optical sensor, the actuator being configured to rotate the wheel.
- the actuator is configured to rotate the wheel according to an instruction of angular position.
- the imaging device further comprises a movement sensor configured to detect a movement of an object or a person in front of the optical sensor.
- the imaging device further comprises a screen display arranged in the front side, and a screen controller configured to control the display of article information on the screen display.
- the processing unit comprises a communication interface configured to receive an activation command from a management server, the memory being configured to register a device identifier which is specific to the imaging device, the processing unit being configured to recognize the device identifier in the received activation command.
- the communications interface further comprises a radiofrequency circuit configured to receive a wireless radiofrequency signal which encodes the activation command, the radiofrequency circuit being preferably configured to receive a wireless radiofrequency signal in a frequency range between 700 Megahertz and 1, 00 Gigahertz or in a range between 2, 40 Gigahertz and 5, 0 Gigahertz.
- the processing unit is configured for transmission of the image to the image server via an image transmittal signal in a frequency range between 2, 40 Gigahertz and 5, 0 Gigahertz.
- the processing unit is further configured to perform identification of an optical code optically transmitted by a light indicator, by image recognition on the basis of a sequence of images wherein the light indicator is visible.

A second object of the invention is a shelf imaging system for a shelf, preferably for a shelf of a gondola of a sales area, which comprises:
- a shelf support configured to extend along an edge of the shelf, the shelf support comprising a receiving section configured to receive electronic labels on the shelf support,
- an imaging device as defined above, the back side of said imaging device being configured to be removably fitted in the receiving section of the shelf support,
- an image server configured to receive an image transmitted by the imaging device.

The shelf imaging system advantageously and non-limitingly comprises a management server, the imaging device further comprising a communication interface, wherein the management server is configured to transmit an activation command to the communication interface, preferably via a wireless radiofrequency signal.

A third object of the invention is a method for image acquisition, the method being executed by an imaging device as defined above and comprising steps of:
- reception of an activation command for acquiring an image or sequence of images,
- acquisition of an image or sequence of images by the optical sensor of the imaging device,
- transmittal of the acquired image or sequence of images by the processing unit of the imaging device to an image server.

The above-defined method can comprise the following advantageous and non-limiting features, taken alone or in any technically feasible combination:
- a device identifier is registered in the memory of the imaging device, said device identifier being specific to the imaging device, wherein the processing unit controls the optical sensor to acquire the image or sequence of images as a result of said device identifier being encoded in the activation command.

the optical sensor of the imaging device has a direction of sight and the imaging device further comprises an actuator which is configured to rotate the optical sensor around one or more axes of rotation of the optical sensor, such that the direction of sight is displaced, the method comprising a step of adjustment of the direction of sight through movement of the actuator according to a wireless adjustment command received from a mobile device.

the acquired image or sequence of images is transmitted by the imaging device via an image transmittal signal in a frequency range between 2, 40 Gigahertz and 5, 0 Gigahertz.

GENERAL PRESENTATION OF THE DRAWINGS

Other characteristics, objectives and advantages of the invention are set forth in the following detailed description, which is solely illustrative and non-limiting, and is to be read in conjunction with the following annexed drawings:

FIG. 1 schematically represents a shelf imaging system of a sales area.

FIG. 5 represents steps of a method for image acquisition according to an embodiment.

DETAILED DESCRIPTION OF EMBODIMENTS OF THE INVENTION

In the description below and in the annexed drawings, similar elements are associated with the same alphanumerical references.

General Architecture of a Shelf Imaging System

Figure 1:
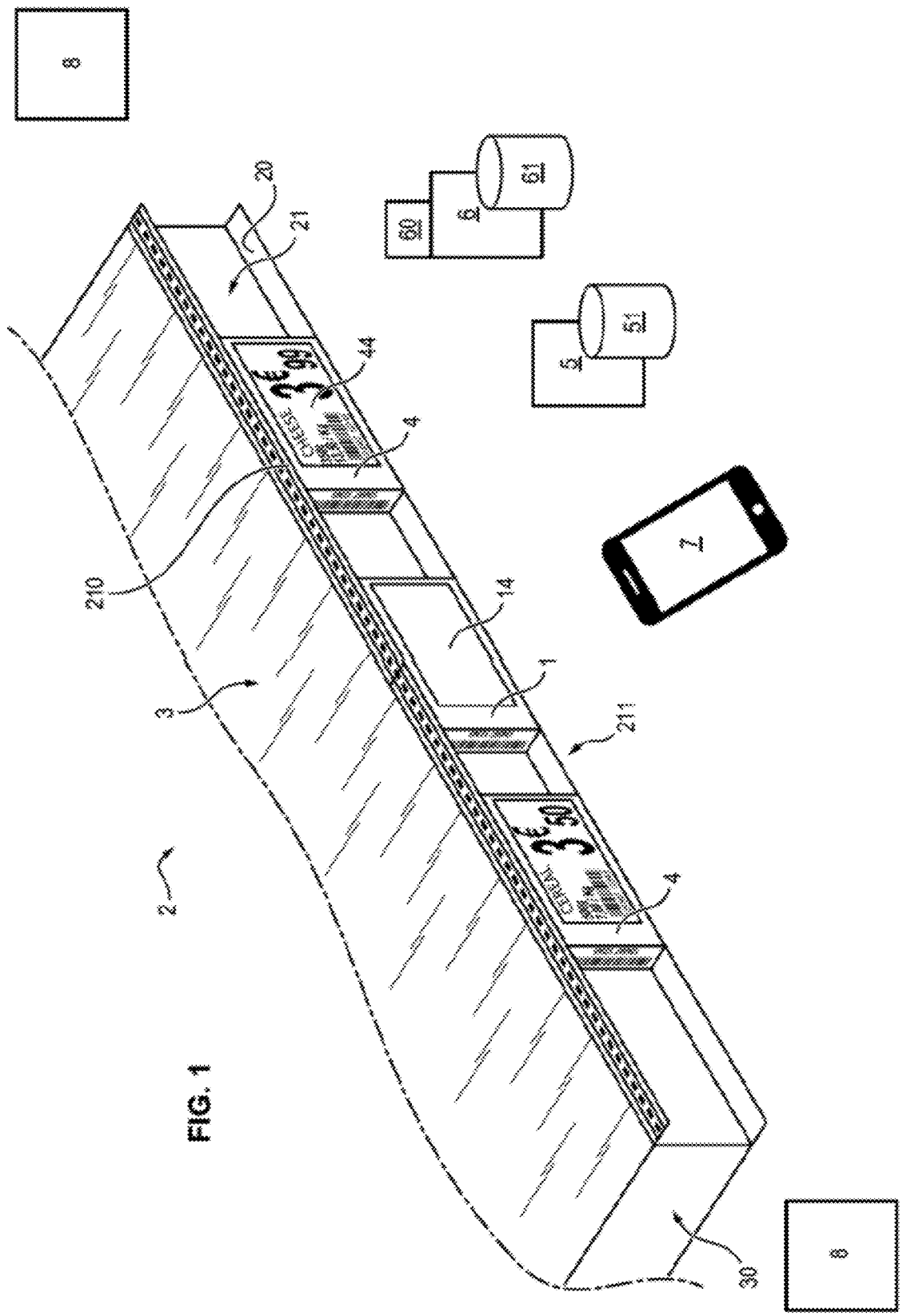

FIG. 1 shows an information display and shelf imaging system 2 intended to be arranged in a sales area, according to one embodiment of the invention.

The system comprises a shelf support 20 adapted to be arranged in the sales area, comprising a receiving section 21 adapted to house a plurality of electronic shelf labels (ESLs) 4. In FIG. 1, only two ESLs are represented for clarity; however, according to its length along the shelf, shelf support can receive a bigger number of ESLs. It is possible to have up to more than ten electronic shelf labels 4 per linear meter of support 2, and hence several thousand, or even tens of thousands of electronic shelf labels in one sales area.

Article information displayed on the screen displays 44 of ESLs 4 typically includes a product name, a price, a price per kilo . . . for the article uniquely associated with an electronic shelf label 4. Other information may be memorized and/or displayed, by ESL 4, such as inventory information.

The selling space of a sales area typically comprises several superimposed shelves ordered in gondolas, on which products are arranged and which delimit aisles forming passageways within the sales area. Each ESL is associated to an area of the shelves intended to receive products corresponding to the same article reference. As will be explained below, imaging system 2 provides images and/or sequences of images accurately representing what the customer actually sees in the shelves when the customer is standing or moving in the passageways of the aisles.

Shelf support 20 is arranged on a shelf edge 30 of shelf 3, in a gondola facing a navigation aisle. Preferably, shelf edge 30 faces a gondola of the sales area which comprises other shelves also provided with ESLs.

Alternatively, shelf support 20 can be arranged on a shelf directly affixed to a wall, or in any kind of shelf comprising a shelf edge on which a shelf support can be placed.

In FIG. 1, shelf support 20 houses several ESLs 4 along with an imaging device 1. In this example, imaging device 1 also serves as an ESL. In other words, imaging device 1 is suitable to display article information, thanks to its screen display 14. Imaging device 1 can alternatively be provided without a screen display.

It will be understood that, while only one imaging device 1 is shown for clarity, each shelf support of the sales area can comprise more than one such imaging device. The compactness of imaging device 1 described hereinafter allows accommodating a plurality of imaging devices, for example regularly spaced in the shelves of the sales area.

As will be seen below, imaging device 1 is configured to be removably and reliably fitted in the receiving section 21 of the shelf support, the latter having an overall concave shape. In this example, receiving section 21 extends between an upper edge 210 and a lower edge 211 of shelf support 20. Shelf support 20 has a U-shaped transverse section. A back side of imaging device 1 is removably fitted in receiving section 21. ESLs 4 are also removably fitted in receiving section 21 via the back sides of their respective casings.

Alternatively, shelf support 20 can be provided with an overall convex shape. For instance, the back side of imaging device 1 can have a concave shape which is adapted to cooperate with a convex edge of shelf support 20.

Management of article information updates for ESLs 4 is, in this example, handled by a central server 6. Central server 6 comprises or has access to an article information database 61 comprising unique associations between a label identifier of an ESL 4 and an article reference, and further comprising article information relating to each article reference. The central server is either specific to the sales area or shared between several sales areas, typically sales areas of the same chain of stores with a cloud-like infrastructure. Central server 6 is a management server of the sales area.

Central server 6 is configured to send radiofrequency instructions to ESLs 4 so that the latter change their screen displays 41. Central server 6 controls a radiofrequency component 60. For instance, radiofrequency component 60 is a high-frequency or ultra-high-frequency transmitter otherwise referred to as an "access point". In the following, radiofrequency component 60 communicates with ESLs 4 via ultra-high frequency in a 2, 40 Gigahertz to 5, 0 Gigahertz frequency range. Alternatively, or additionally, radiofrequency component 60 can emit in a 700 Megahertz to 1, 0 Gigahertz frequency range. The sales area can comprise several radiofrequency transmitters. Central server 6 can also be used to send firmware updates to the ESLs and/or the imaging device.

FIG. 1 further shows an image server 5 configured for two-way communication with imaging device 1. Image server 5 is configured to receive images acquired by imaging device 1. For this purpose, image server 5 comprises or has access to an image database 51 for registering images. Image server 5 is optionally configured to perform image processing, for example automated recognition of ESLs and/or products and/or empty areas in gondola images. In addition, image server 5 is preferably configured to send instructions to a processing unit of imaging device 1, to control acquisition of images.

Wireless communication between image server 5 and imaging device 1 is preferably carried out over a wireless ultra-high frequency connection, for instance in a 2, 40 Gigahertz to 5, 0 Gigahertz frequency range. Alternatively, said communication uses high frequencies, for instance between 700 Megahertz and 1, 0 Gigahertz.

Advantageously, communication between image server 5 and imaging device 1 is performed via one or more of the radiofrequency components 60 of the sales area. Image server 5 and central server 6 are optionally one and the same; this is advantageous in terms of costs and reduction of the complexity of the sales area infrastructure.

Optionally, shelf edge 30 of shelf 3 is equipped with an ESL management module (not shown) comprising a communications module. An example of ESL management module is disclosed in patent application US 2019/0080633 A1 filed in the name of the Applicant. In this document, a shelf is equipped with an ESL management module and with conductive traces running across the length of a shelf edge, behind the ESL receiving section.

With this management module, receipt of instructions from central server 6 can be centralized at management module level. Article information updates can then be supplied to each of the ESLs via the management module. An advantage of the management module is that electronic shelf labels 4 can be free of any wireless communication system having a range of more than five meters, possibly even of more than one meter.

The management module disclosed in patent application US 2019/0080633 A1 is optionally also able to handle power supply to the ESLs 4 and to the imaging device 1, if a power supply module is included in the management module. Power lines running across the length of shelf edge 30 connect a power supply module to electrical connectors of the ESLs.

Optionally, but advantageously, the shelf imaging system is configured to interact with a mobile device 7 via a wireless connection. Mobile device 7 is preferably a smartphone, tablet device or PDA used by a member of the staff of the sales area.

Mobile device 7 is preferably able to establish a connection with imaging device 1 via short-range communication, for example with a range between 1 and 10 centimeters, such as 5 centimeters. Imaging device 1 typically comprises an NFC (Near Field Communication) component and a communications canal with mobile device 7 is established via NFC. The frequency for NFC communication can be 13, 56 Megahertz. An advantage of using NFC communication is its very short communications range, which increases precision and security of the communication with mobile device 7. The NFC communications range between the mobile device and the imaging device is typically equal to 5 centimeters. The mobile device has to be placed at a distance lower than this range to initiate NFC communication with the imaging device. When ESLs 4 are also suitable for NFC communication, the NFC communications range between the mobile device and the ESLs is also preferably between 1 and 10 centimeters.

As hereinafter described in further detail, mobile device 7 can send a wireless adjustment command to a processing unit of imaging device 1, such that an actuator comprised in the imaging device forces an optical sensor of the imaging device to change its direction of sight.

Optionally, each of the ESLs 4 also comprises an NFC element, preferably a passive NFC chip, which allows mobile device 7 and/or another mobile device to acquire a label identifier via NFC and/or establish a communication with an ESL 4. In each ESL, the label identifier uniquely associated with said ESL can be encoded in the NFC chip, such that the mobile device 7 is able to read the label identifier upon starting NFC short-range communication with said ESL.

In addition, mobile device 7 is optionally configured to geolocate the imaging device 1 and/or the ESLs 4. For this purpose, mobile device 7 advantageously has a geolocation module 70. For geolocation of the imaging device and the ESLs, a plurality of radiofrequency beacons 8 is advantageously spread over the sales area. The radiofrequency beacons 8 are configured to emit radiofrequency signals. For example, said beacons are installed on the ceiling of the sales area. Said beacons typically emit signals in a frequency band over 500 Megahertz using UWB technology (for "Ultra Wide Band").

Alternatively, a mobile device is not needed for geolocating the imaging device 1 and/or the ESLs 4. A geolocation module can be embedded directly in the imaging device and/or the labels. In this case, the imaging device or the ESL receives radiofrequency signals from the beacons and geolocation is done directly through the beacon network.

The geolocation module is configured to process radiofrequency signals coming from radiofrequency beacons 8, in order to determine geolocation data relating to a current position of the mobile device.

In an example, mobile device 7 is able to acquire an identifier of an ESL or an identifier of the imaging device (for example via NFC), at an acquisition time when the mobile device 7 is close enough to said ESL or device. Then, the mobile device acquires radiofrequency signals from radiofrequency beacons 8 at said acquisition time, via geolocation module 70. The mobile device then either determines geolocation data for said ESL or device by itself, or communicates the received radiofrequency signals to a server (for instance to central server 6) so that said server determiners the geolocation data.

In case the central server 6 manages a realogram representing the layout of articles in the shelves of the sales area, the determined geolocation data is advantageously registered in the realogram, in association with the corresponding ESL or imaging device.

Alternatively, or in combination with the radiofrequency beacons, luminaires emitting light signals can be used for geolocation. The luminaires typically embed a VLC (for "Visible Light Communication") technology. In this case, the geolocation module of mobile device 7 is a module for decoding the VLC light signals.

A geolocation module for a mobile device and a method for geolocation of ESLs is further disclosed in international application WO 2018/046701 A1.

Alternatively, the geolocation of the imaging device 1 and/or the geolocation of the ESLs 4 is managed by another device separate from mobile device 7.

Imaging system 2 is generally not costly since, as already mentioned, this system takes advantage of a conventional electronic shelf labelling infrastructure. The infrastructure for data communication and power supply to imaging device 1 can be largely mutualized with an existing infrastructure for electronic shelf labels. Besides, imaging system 2 is easily scalable and adaptable to the desired layout of the aisles.

Example Imaging Device

Figure 2:
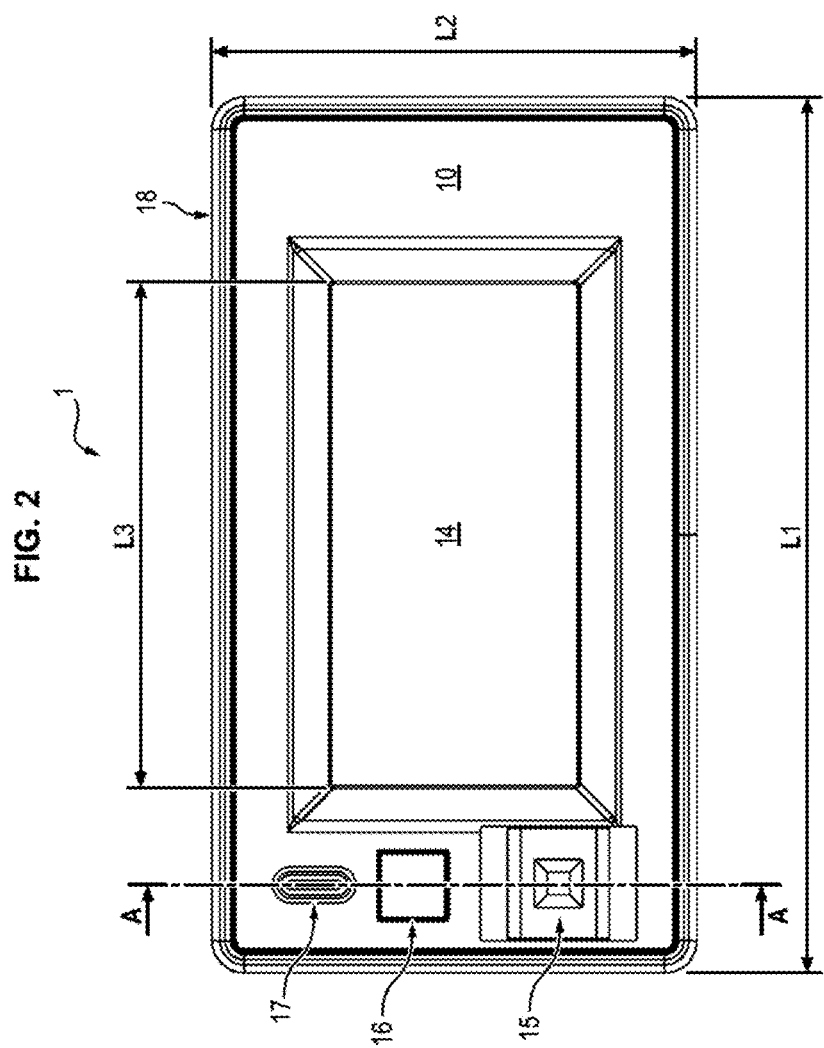
FIG. 2 is a schematic front view of an imaging device according to a particular embodiment of the invention included in the shelf system of FIG. 1.
Figure 3:
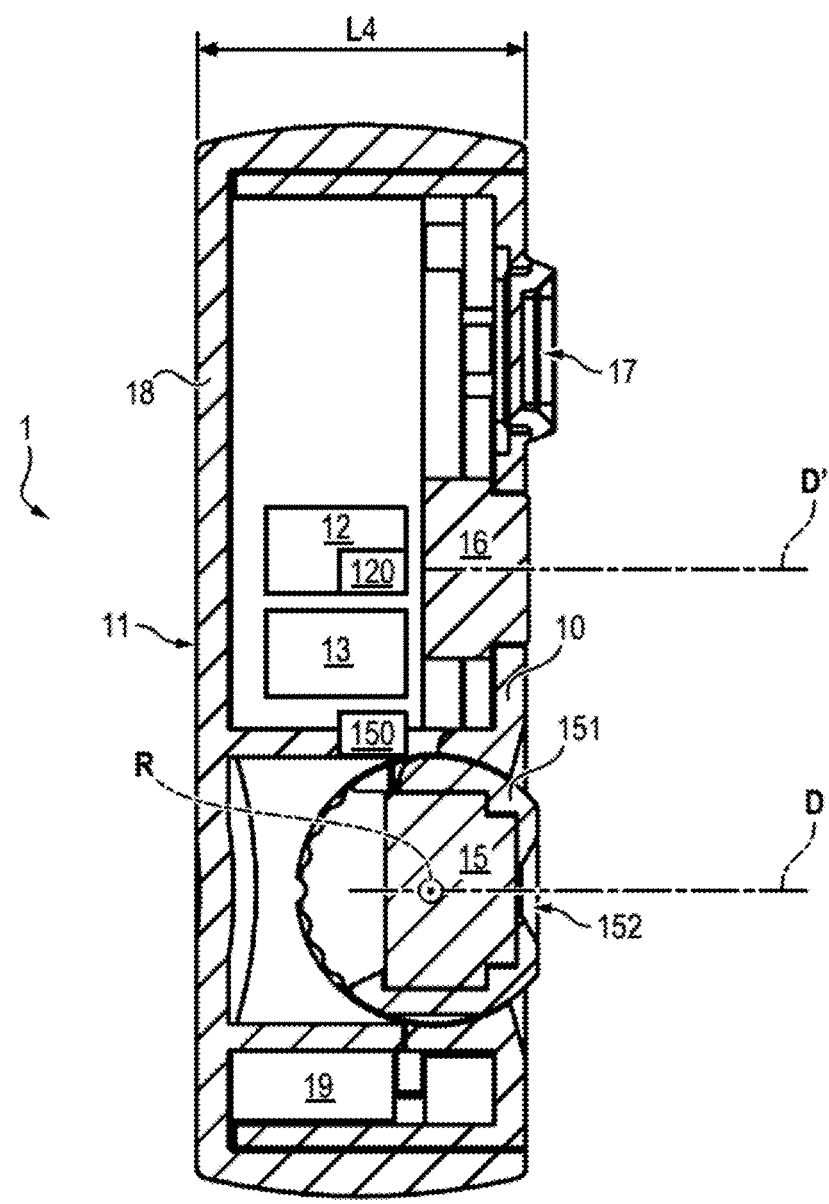
FIG. 3 is a schematic side view of the imaging device of FIG. 2 along the A-A line shown in FIG. 2.

An exemplary imaging device 1, which can be used as the imaging device shown in FIG. 1, is illustrated in the schematic front view of FIG. 2. A schematic transverse sectional view of imaging device 1 along the A-A line of FIG. 2 is shown in FIG. 3.

Imaging device 1 is viewed from its front side 10 in FIG. 2. Front side 10 is located at the right of FIG. 3, with a back side 11 opposite to front side 10 also being shown.

Imaging device 1 comprises a processing unit 12 and a memory 13 and further comprises an optical sensor 15. The processing unit, memory and optical sensor are typically mounted on a printed circuit board (not shown) of imaging device 1.

Imaging device 1 is preferably provided with a casing 18. Here, casing 18 has an overall parallelepipedal shape. Casing 18 is limited by front side 10, back side 11 and four other, usually smaller sides.

Casing 18 advantageously has dimensions close to the dimensions of a usual electronic shelf label for a sales area. The depth L4 of casing 18 is preferably comprised between 10 and 30 millimeters. The length L1 of casing 18 is preferably comprised between 50 and 100 millimeters. The width L2 of casing 18 is preferably comprised between 40 and 80 millimeters.

The small dimensions of imaging device 1, compared to a usual video camera, along with its ability to be fitted into a shelf support in the middle of the other ESLs, allow imaging device 1 to be almost invisible to a customer of the sales area. Thus, imaging device 1 does not detract from the aesthetical qualities of the shelves. The customer experience is not disturbed by the presence of the shelf imaging system.
Camera Acquisition of images is performed by an optical sensor 15 of the imaging device.

Optical sensor 15 is typically a camera comprising an optical lens or series of lenses. A focal length of optical sensor 15 is preferably adjustable, especially in accordance with a distance between a gondola in which imaging device 1 is arranged and the opposite gondola. It will be understood that imaging device 1 can also comprise several optical sensors, for example sensors targeting different heights or different gondola areas.

Optical sensor 15 has small dimensions, such that it can be fitted on the front side 10 of the imaging device. This is especially important if imaging device 1 also comprises a screen display for display of article information or other information, as the screen display needs to be as wide as possible to allow customers comfortable reading from the aisles. Here, optical sensor 15 is included in a parallelepiped (not shown in the drawings) having a length of less than 1 centimeter and a width of less than 1 centimeter. Optical sensor 15 is integral to casing 18 and preferably does not require profound changes to the general shape of casing 18, compared to the usual casing for an ESL.

A direction of sight D of optical sensor 15 is, by default, substantially perpendicular to a front plane of another gondola facing the gondola in which imaging device 1 is arranged. It is preferably perpendicular to the surface of front side 10 of the imaging device. The images acquired via optical sensor 15 usually display any articles and/or shelf spaces and/or ESLs provided in said other gondola at substantially the same height as the shelf support receiving the imaging device.

Thus, the images or videos acquired by optical sensor 15 accurately reflect the line of sight of a person walking along an aisle of the sales area.

Even though the default position of the imaging device preferably corresponds to the line of sight of a person, other articles and/or shelf spaces and/or ESLs which are not positioned along said line of sight, or any other elements of the sales area, may need to be visible in the acquired images. Thus, the direction of sight D of optical sensor 15 is preferably adjustable, in order to target elements located at different heights relative to the floor.

In this regard, optical sensor 15 is preferably mounted on a movable support within casing 18. Here, as illustrated in FIG. 3, optical sensor 15 is affixed to a wheel 151. The wheel has a rotation axis R which is preferably parallel to the surface of the front side 10 of imaging device 1. Optical sensor 15 is linked in rotation with wheel 151.

Besides, an optical aperture 152 is provided in the casing 18 to allow light to reach the optical sensor. Here, optical aperture 152 is provided in front side 10 of casing 18. Rotation of the wheel 151 makes optical sensor 15 move facing the optical aperture.

An actuator 150 is provided here in order to rotate wheel 151. Actuator 150 is controlled to move wheel 151 in accordance with an instruction of angular position. The instruction is for example a numerical value of desired angular deviation between the direction of sight D and a horizontal plane. Here, processing unit 12 comprises an actuator communication interface (not shown) for two-way communication with actuator 150.

Alternatively, or in combination with actuator 150, a manual wheel adjustor mechanically linked to wheel 151 can be provided on casing 18, such that a member of the sales personnel manually adjusts the direction of sight D of optical sensor 15.

Figure 4:
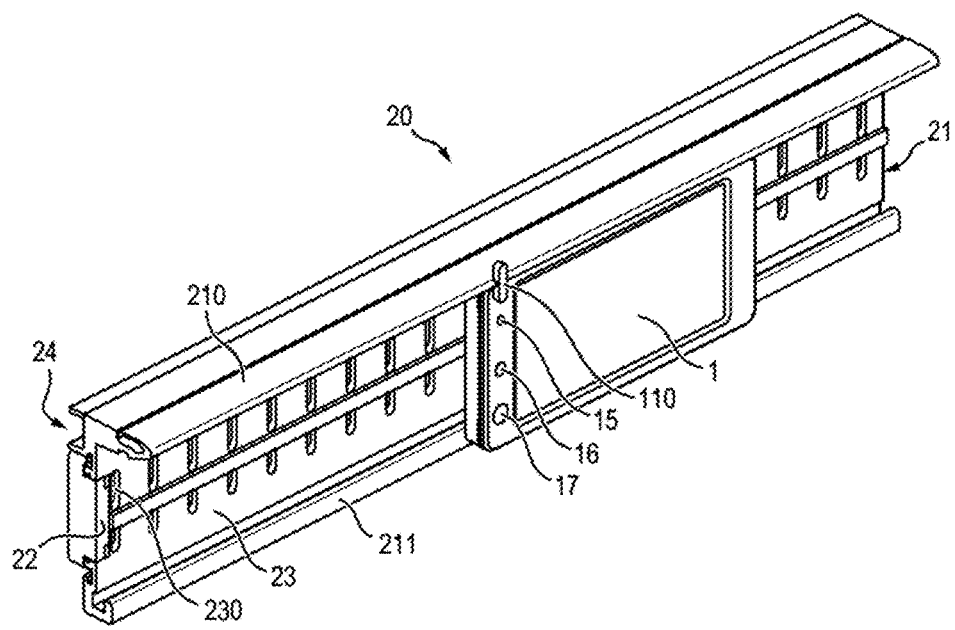
FIG. 4 is a schematic perspective view of a shelf support of the shelf imaging system of FIG. 1.

The imaging device advantageously comprises a second wheel (not visible in the drawings) allowing rotation of optical sensor 15 around a second axis of rotation which is preferably perpendicular to axis R. The optical sensor 15 is also mounted on this second wheel.
Mechanics and Engagement Between Imaging Device and Shelf Support FIG. 4 is a schematic close-up view of a section of shelf support 20 wherein imaging device 1 is removably fitted.

Shelf support 20 comprises receiving space 21 between upper edge 210 and lower edge 211 on its front side, and comprises on its rear side an element for mechanical coupling with shelf edge 30, such that shelf support is fixed on shelf 3. Here, said element is a bracket 24 having a generally concave shape, configured to grip the shelf edge. The rear side further comprises an abutment 22, which serves for example to receive an ESL management module.

For detachable engagement with shelf support 20, imaging device 1 preferably comprises a locking element 110 which is movable between a retracted position and an extended position. In the example of FIG. 4, locking element 110 is a retractable pin protruding from an upper side of casing 18 of imaging device 1. In the retracted position of the locking element, locking element 110 is at least partly fitted inside the casing and imaging device 1 is detachable from the receiving space, whereas in the extended position, locking element 110 can be fitted into a corresponding receiving element of the shelf support. Imaging device 1 is no longer removable until locking element 110 is switched to the retracted position again. The corresponding element is, for instance, an orifice having substantially the same dimensions as the locking element of imaging device 1. Shelf support 20 can comprise several regularly spaced orifices, such that the possible positions for imaging device 1 along receiving space 21 are predetermined.

In this case, upper edge 210 and lower edge 211 are preferably made of a material with some flexibility, to allow a member of the sales personnel to force imaging device 1 into the receiving space at the position where it needs to be fixed.

Switching of locking element 110 between retracted and extended position is typically controllable only by a member of the sales personnel, to prevent other individuals from taking off imaging device 1. For instance, switching is controlled by mobile device 7.

In the example of FIG. 4, the receiving space 21 is further provided with a separator plate 23. This separator plate forms a back side of the receiving space. Behind said plate, power lines and/or data communication lines can be arranged. Through-holes 230 are provided to allow electrical contact with the power lines and/or data communication lines and electrical connectors (not shown) provided at the back side of the imaging device.

Other Components

Processing unit 12 is housed in casing 18. In this example, imaging device 1 comprises a screen display 14, and processing unit 12 is located in a region between back side 11 and a rear face of screen display 14.

Code instructions for running imaging device 1 are encoded in processing unit 12 to control optical sensor 15, as well as optional screen display 14, movement sensor 16 and light indicator 17.

In this example, processing unit 12 comprises a communications interface 120 for receiving instructions from other entities of the sales area. In particular, communications interface 120 is configured to receive an activation command from central server 6. Reception of the activation command results in optical sensor 15 being activated and the processing unit 12 controlling acquisition of an image or sequence of images by optical sensor 15 at a desired time.

The activation command received from central server 6 can be an instruction to perform image acquisition immediately. Alternatively, the activation command can be an instruction to acquire an image or sequence of images after a predetermined period of time, for example a period of time encoded in the activation command, has elapsed.

A device identifier which is unique and particular to imaging device 1 is preferably stored in memory 13 of the imaging device. An activation command particularly targeted at imaging device 1 encodes said device identifier, and the processing unit 12 is able to recognize said device identifier in the received activation command.

Preferably, imaging device 1 is switchable between a sleep mode with optical sensor 15 consuming less energy, and a wake-up mode wherein optical sensor 15 is active. In this manner, less energy is consumed at times when no image needs to be acquired.

Communications interface 120 advantageously comprises a radiofrequency circuit configured to receive a wireless radiofrequency signal (encoding the activation command for optical sensor 15) in an ultra-high frequency range between 700 Megahertz and 1, 00 Gigahertz or in a high frequency range between 2, 40 Gigahertz and 5, 0 Gigahertz.

Communications interface 120 is advantageously also configured to transmit images or sequences of images in digital format via a wireless connection to a server, advantageously to image server 5. Transmittal of the images or sequences of images is preferably done over a Wi-Fi connection, especially if the files have a large size, but the images can alternatively be transmitted over a frequency range between 700 Megahertz and 1, 0 Gigahertz.

As mentioned above, imaging device 1 advantageously also serves as an electronic shelf label for displaying prices and/or other pieces of article information, thanks to its screen display. This allows saving space in shelf support 20, such that more ESLs or other components can be accommodated in the same receiving space of the shelf support.

In this regard, imaging device 1 optionally includes, as seen in FIG. 2, a screen display 14 arranged in front side 10 and a screen controller (not shown) configured to control the display of article information on screen display 14. Screen display 14 is typically an electronic ink display (commonly known as "e-paper") and/or a LED display.

As mentioned above, screen display 14 is as big as possible so that customers can comfortably read the displayed information. The length and width of the screen are preferably respectively equal to at least 50% of the total length and at least 50% of the total width of imaging device 1. In this example, screen display 14 has a length between 30 and 60 millimeters and a width between 15 and 30 millimeters.

If, as mentioned above, imaging device 1 is switchable between a sleep mode and a wake-up mode, and if the imaging device comprises a screen display, said display remains lit up even in sleep mode, such that customers can read article information even when no image is being acquired by the imaging device.

When imaging device 1 also serves as an electronic shelf label, the device identifier is typically the same as the label identifier which is uniquely associated with an article reference in central database 61 of the sales area.

For the purpose of receiving article information updates, imaging device 1 comprises a radiofrequency circuit (not shown) configured to receive article information updates from central server 6, typically the same radiofrequency circuit which receives the activation command for optical sensor 15.

In this example, imaging device 1 further comprises a movement sensor 16 configured to detect a movement of an object or a person in front of optical sensor 15. Movement sensor 16 is for example an infrared sensor. Movement sensor 16 can send stop signals to optical sensor 15 and/or to image server 5 such that no image is acquired when the field of view of optical sensor 15 is obstructed. Further processing of the acquired gondola images to account for the obstruction of the field of view of the optical sensor is therefore avoided.

Movement sensor 16 is preferably arranged close to optical sensor 15, and is preferably configured to detect an obstruction (such as the crossing of a person) on an axis D' which is perpendicular to the surface of front side 10 of the imaging device.

In this example, imaging device 1 further comprises a light indicator 17. Indicator 17 is provided here in a top-left corner of front side 10 of imaging device 1. Thanks to this light indicator, imaging device 1 can react to a blinking instruction (for instance an instruction of central server 6) to become more visible in an acquired image of the gondola in which imaging device 1 is arranged. When imaging device 1 is associated with a unique article reference, indicator 17 is typically configured to blink shortly upon receiving a command from the central server, requiring all ESLs associated with said article reference to blink.

Here, imaging device 1 comprises a battery 19, for instance a lithium-ion rechargeable battery. For example, battery 19 is housed in the lower end of casing 18, below the optical sensor 15. Battery 19 supplies power to optical sensor 15, screen display 14, processing unit 12 and any other electronic components of the imaging device 1.

In an alternate example, imaging device 1 comprises electrical connectors for connection to power lines of the shelf support. In particular, when shelf edge 30 of shelf 3 is equipped with an ESL management module, conductive traces running across the length of the shelf edge can be provided to connect the ESL management module to the imaging device 1 (and optionally also to ESLs 4) to supply power to imaging device 1. Imaging device 1 is therefore hardwired to the power supply module via its electrical connectors. An advantage is that power supply for the ESLs and the imaging device(s) of the shelf support is centralized at management module level, and more space is available inside casing 18 for the optical sensor and, as the case may be, for the screen.

If adjustment commands for adjusting the angular position of optical sensor 15 are provided, imaging device 1 is further configured to receive the adjustment commands from an external entity. Advantageously, said external entity is mobile device 7 and the adjustment commands are sent over a short-range communications canal, such as an NFC canal. In this case, imaging device 1 comprises an NFC component (not shown), either a passive NFC chip or an NFC antenna such as a loop antenna.

When the shelf imaging system comprises a mobile device 7 configured to geolocate the imaging device in the sales area, a memory of the NFC component of imaging device 1 advantageously encodes the unique device identifier of imaging device 1. In this manner, when the mobile device 7 is moved in close proximity (typically between 1 and 10 centimeters) to imaging device 1, mobile device 7 acquires the unique device identifier. It is then possible to associate the device identifier with geolocation data determined via mobile device 7 in a database, on the basis of radiofrequency signals or VLC signals acquired by the geolocation module 70 of mobile device 7.

An NFC component of imaging device 1 is advantageously also used for setup of the imaging device 1. Once imaging device 1 is mounted in the shelf support, an easy setup procedure is carried out by NFC communication between imaging device 1 and mobile device 7. Geolocation data of the imaging device 1 are advantageously acquired during the setup procedure.

Method for Acquiring an Image or Sequence of Images of Shelves

FIG. 5 represents steps of a method 50 for acquiring shelf images according to an example embodiment. Said method is advantageously executed by the system of FIG. 1 comprising the imaging device 1 affixed to shelf support 20.

At optional step 100, a triggering event occurs which raises a need for an acquisition of an image or sequence of images by imaging device 1, typically acquisition of images of a front side of a gondola opposite to the gondola in which imaging device 1 is positioned.

For example, the triggering event is an article information update. Said update can comprise a change of price information causing a change of the information displayed on screen display 44 of one or several ESLs 4, and/or a change of stock information relating to an article reference, when the checkout system of the sales area notifies that one or several products corresponding to said article reference have been purchased. The triggering event can also be a command sent to an ESL 4 for transmitting a specific optical code via light indicator 17 of ESL 4. The optical code is typically a label identifier of ESL 4.

Alternatively, the triggering event for image acquisition is a timer issued by central server 6, or issued by another server, possibly a remote server connected to central server 6 via a cloud network infrastructure.

Alternatively, the triggering event for image acquisition occurs simultaneously to the transmittal of the activation command to the imaging device. For instance, if the triggering event for image acquisition is an article information update transmitted to several ESLs 4, and if the activation command is transmitted by radiofrequency transmitter 60 to imaging device 1 via the same radiofrequency communication protocol (for example ultra-high frequency communication) as the article information updates, the activation command and the article information update can be sent at the same time, such that the acquired images reflect the change of article information.

Method 50 optionally comprises an adjustment of the direction of sight D of optical sensor 15, prior to or during image acquisition. For example, wheel 151 is controlled by actuator 150 to rotate around axis R as illustrated in FIG. 3, such that the angular deviation between direction of sight D and a horizontal plane changes. An adjustment command is received by imaging device 1 via wireless communication, preferably via NFC short-range communication with mobile device 7. The adjustment command encodes an instruction of angular position. Said instruction is transmitted to actuator 150, and the latter is activated to rotate wheel 151 in accordance with the instruction of angular position.

Returning to FIG. 5, method 50 comprises a step 200 of reception of the activation command by imaging device 1. Activation command is typically transmitted to imaging device 1 by radiofrequency transmitter 60 via wireless communication, advantageously in a frequency range between 700 Megahertz and 1, 00 Gigahertz or in a frequency range between 2, 40 Gigahertz and 5, 0 Gigahertz.

An advantage of high frequency or ultra-high frequency communication is a high reactivity of the imaging device.

Acquisition of an image or sequence of images by imaging device 1 is then performed at a step 300. The images are preferably images of a shelf or several shelves of an opposite gondola. The images are advantageously registered in memory 13 of imaging device 1 in the form of digital images.

At step 400, the acquired image or sequence or images is transmitted by processing unit 12 to image server 5, and it is registered in image database 51. As mentioned above, image server 5 and central server 6 are optionally one and the same server.

The transmission of the acquired image or sequence of images at step 400 is advantageously done via wireless communication in a Wi-Fi frequency range, between 2, 40 Gigahertz and 5, 0 Gigahertz. It is advantageous to use such ultra-high frequencies when the acquired files have a large size. In particular, Wi-Fi communication is effective when long sequences of images are to be transmitted and/or when the resolution of the acquired images is high. Alternatively, the transmission of the acquired image or sequence of images is done in a frequency range corresponding to the frequencies of communication between central server 6 and ESLs 4, typically between 700 Megahertz and 1, 0 Gigahertz.

Optionally, if shelf imaging system 2 comprises a mobile device 7 operated by a member of the sales personnel, the acquired images can be displayed in real-time on a screen of the mobile device. In this manner, the sales personnel can control in real-time what the customers of the sales area can see when looking at the imaged gondola. The sales personnel are able to monitor article information updates and/or available stocks of articles in the shelves. In this case, the acquired image or sequence of images is either extracted by mobile device 7 from image database 51 or transmitted to mobile device 7 directly.

Method 50 has several advantages. Thanks to the position of imaging device 1 in shelf support 20 of shelf 3, imaging device 1 is able to acquire images with an orientation and at a height with respect to the floor which accurately reflects the line of sight of a person standing in the aisles of the sales area. The use of an optical sensor of imaging device 1 is especially advantageous to acquire images of a front side of a gondola opposite to the imaging device, as the direction of sight of the imaging device can be made generally perpendicular to said frond side. Besides, if a movement sensor 16 is provided in imaging device 1, image acquisition can be interrupted when the field of vision of optical sensor 15 is obstructed, such that unnecessary acquisition of unworkable images is avoided.

In addition, since imaging device 1 is removable from shelf support 20, it is easily replaced, repaired or displaced. Image acquisition can be quickly reiterated to verify a correct positioning of imaging device with respect to the zones which need to be imaged.

As mentioned above, it is advantageous to transmit the activation command for the imaging device via the same radiofrequency transmitter as for the emission of article information updates, for example via an "access point" of the sales area. In this manner, a synergy is achieved with the existing standard infrastructure of the ESLs disposed in the shelves. The mechanical infrastructure for positioning the ESLs and powering them is re-used for the imaging device, as well as the radiofrequency protocols for communication of data.

The invention claimed is:

1. A shelf imaging system for a first shelf of a first gondola and a second shelf of a second gondola of a sales area, the second gondola facing the first gondola, the shelf imaging system comprising:
    a first shelf support configured to be installed on a first shelf edge of the first shelf and comprising a first receiving section configured to receive first electronic labels on the first shelf support;
    a first imaging device for the first shelf support, wherein the first imaging device comprises:
    a first back side configured to be removably fitted in the first receiving section,
    a first front side opposite to the first back side,
    a first optical sensor configured to acquire an image of the second gondola,
    a first memory configured to register a first device identifier which is specific to the first imaging device and to save the image acquired by the first optical sensor,
    a first processing unit which comprises a first communication interface, and
    a first light indicator on the first front side of the first imaging device,
    a management server being configured to send an activation command,
    the first communication interface of the first processing unit being configured to receive the activation command from the management server, the first processing unit being configured to recognize the first device identifier being encoded in the activation command, to control the first optical sensor to acquire the image of the second gondola in response to recognizing the first device identifier and to transmit the acquired image of the second gondola to an image server,
    a second shelf support configured to be installed on a second shelf edge of the second shelf of the second gondola and comprising a second receiving section configured to receive second electronic labels on the second shelf support;
    a second imaging device for the second shelf support, wherein the second imaging device comprises:
    a second back side configured to be removably fitted in the second receiving section,
    a second front side opposite to the second back side,
    a second optical sensor,
    a second memory,
    a second processing unit which comprises a second communication interface,
    a second light indicator on the second front side of the second imaging device, the second processing unit being configured to receive a blinking instruction from the management server and, as a result of receiving said blinking instruction, to command the second light indicator to blink,
    the management server being configured to send the blinking instruction and the activation command so that a light emitted by the second light indicator when commanded to blink in response to the blinking instruction is visible in the image of the second gondola acquired by the first optical sensor in response to the activation command.

2. The shelf imaging system of claim 1, wherein the second optical sensor is configured to acquire an image of the first gondola, the second memory being configured to register a second device identifier which is specific to the second imaging device and save the image of the first gondola acquired by the second optical sensor,
    the second communication interface of the second processing unit being configured to receive a supplementary activation command from the management server, the second processing unit being configured to recognize the second device identifier being encoded in the supplementary activation command, to control the second optical sensor to acquire the image of the first gondola in response to recognizing the second device identifier and to transmit the acquired image to the image server.

3. The shelf imaging system of claim 2, wherein
    the first processing unit is configured to receive a supplementary blinking instruction from the management server and, as a result of receiving said supplementary blinking instruction, to command the first light indicator to blink,
    the management server being configured to send the supplementary blinking instruction and the supplementary activation command so that a light emitted by the first light indicator when commanded to blink in response to the supplementary blinking instruction is visible in the image of the first gondola acquired by the second optical sensor in response to the supplementary activation command.

4. A method for image acquisition executed by a shelf imaging system according to claim 1, comprising the steps of:

commanding the second light indicator to blink in response to the second processing unit of the second imaging device receiving the blinking instruction from the management server;

receiving an activation command by the first communication interface of the first processing unit of the first imaging device for acquiring an image or a sequence of images;

as a result of said first device identifier being encoded in the activation command, acquiring an image or a sequence of images of the second gondola by the first optical sensor of the first imaging device, so that a light emitted by the second light indicator when commanded to blink is visible in the acquired image of sequence of images of the second gondola; and transmitting the acquired image or sequence of images of the second gondola by the first processing unit of the first imaging device to the image server.

5. A shelf imaging system for a first shelf of a first gondola and a second shelf of a second gondola of a sales area, the second gondola facing the first gondola, the shelf imaging system comprising:

a first shelf support configured to be installed on a first shelf edge of the first shelf and comprising a first receiving section configured to receive first electronic labels on the first shelf support;

an imaging device for the first shelf support, wherein the imaging device comprises:
   a first back side configured to be removably fitted in the first receiving section,
   a first front side opposite to the first back side,
   an optical sensor configured to acquire an image of the second gondola,
   a memory configured to register a device identifier which is specific to the imaging device and to save the image acquired by the optical sensor, and,
   a first processing unit which comprises a first communication interface, a management server being configured to send an activation command, the first communication interface of the first processing unit being configured to receive the activation command from the management server, the first processing unit being configured to recognize the device identifier being encoded in the activation command, to control the optical sensor to acquire the image of the second gondola in response to recognizing the device identifier and to transmit the acquired image of the second gondola to an image server, a second shelf support configured to be installed on a second shelf edge of the second shelf of the second gondola and comprising a second receiving section configured to receive second electronic labels on the second shelf support;

a blinking device for the second shelf support, wherein the blinking device comprises:
   a second back side configured to be removably fitted in the second receiving section,
   a second front side opposite to the second back side,
   a second processing unit which comprises a second communication interface,
   a light indicator on the second front side of the blinking device, the second processing unit being configured to receive a blinking instruction from the management server and, as a result of receiving said blinking instruction, to command the light indicator to blink, the management server being configured to send the blinking instruction and the activation command so that a light emitted by the light indicator of the blinking device when commanded to blink in response to the blinking instruction is visible in the image of the second gondola acquired by the optical sensor of the imaging device in response to the activation command.

6. A method for image acquisition executed by a shelf imaging system according to claim 5, comprising the steps of:

commanding the light indicator to blink in response to the second processing unit of the blinking device receiving the blinking instruction from the management server, receiving an activation command by the first communication interface of the first processing unit of the imaging device for acquiring an image or a sequence of images, as a result of said device identifier being encoded in the activation command, acquiring an image or a sequence of images of the second gondola by the optical sensor of the imaging device, so that a light emitted by the light indicator when commanded to blink is visible in the acquired image of sequence of images of the second gondola, and, transmitting the acquired image or sequence of images of the second gondola by the first processing unit of the imaging device to the image server.

\* \* \* \* \*